United States Patent [19]

Tsugita et al.

[11] Patent Number: 5,011,557
[45] Date of Patent: Apr. 30, 1991

[54] METHOD FOR FORMING JOINED SECTION OF OPTICAL BRANCH FIBERS PRODUCT, AND APPARATUS THEREFOR

[75] Inventors: Hiroshi Tsugita, Ueda; Takao Shimizu, Koushoku, both of Japan

[73] Assignees: Kurashiki Boseki Kabushiki Kaisha, Okayama; Chikuma Koki Co., Ltd., Nagano, both of Japan

[21] Appl. No.: 486,103

[22] Filed: Feb. 28, 1990

[30] Foreign Application Priority Data

Mar. 1, 1989 [JP] Japan .................................. 1-49028

[51] Int. Cl.⁵ .......................... D04H 3/08; G02B 6/26; G02B 5/14
[52] U.S. Cl. ...................................... 156/180; 65/4.21; 65/4.3; 156/166; 156/296; 156/441; 350/96.15
[58] Field of Search ............... 156/296, 180, 441, 166, 156/309.6; 65/4.21, 4.3; 350/96.15

[56] References Cited

U.S. PATENT DOCUMENTS

| | | | |
|---|---|---|---|
| 3,905,852 | 9/1975 | Mukai et al. | 156/296 X |
| 4,632,513 | 12/1986 | Stowe et al. | 156/166 X |
| 4,668,264 | 5/1987 | Dyott | 65/3.11 |
| 4,820,366 | 4/1989 | Beever et al. | 156/166 |

FOREIGN PATENT DOCUMENTS

| | | |
|---|---|---|
| 53-127750 | 11/1978 | Japan ..................................... 65/4.3 |
| 57-115503 | 7/1982 | Japan ..................................... 65/4.3 |
| 57-205708 | 12/1982 | Japan . |
| 59-143119 | 8/1984 | Japan . |
| 61-208010 | 9/1986 | Japan . |

Primary Examiner—Robert L. Lindsay
Attorney, Agent, or Firm—Wenderoth, Lind & Ponack

[57] ABSTRACT

The present invention is drawn to a method for forming a section in which a plurality of optical branch fibers are joined with each other. The branch fibers are connected with a single optical trunk fiber at the end faces thereof contacting each other. The configuration and area of the end face of the joined section of branch fibers are substantially identical to those of the end face of the trunk fiber. A die has a through-hole, for shaping the branch fibers, the sectional area and configuration of which are equal to those of the end face of the trunk fiber as taken perpendicular to the axis thereof. The branch fibers supplied to the heated die at a predetermined amount ratio are simultaneously drawn through the die. The ratio between amounts of respective branch fibers to be supplied to the die is set to correspond with a desired signal branching ratio of the optical coupler to be obtained.

4 Claims, 3 Drawing Sheets

METHOD FOR FORMING JOINED SECTION OF OPTICAL BRANCH FIBERS PRODUCT, AND APPARATUS THEREFOR

BACKGROUND OF THE INVENTION

1. Field of the Invention

The present invention generally relates to a method for forming a joined or bound section of optical branch fibers and an apparatus therefor, and more particularly, to a method for forming the joined section of a plurality of optical fibers, constituting part of an optical coupler, and an apparatus therefor by which method the end faces of the joined section and a single optical trunk fiber can be connected with each other to complete the optical coupler.

2. Description of the Related Art

The formation of a joined section of branch fibers is a necessary process for fabricating an optical coupler in which a trunk fiber is coupled to the plurality of branch fibers. Optical couplers are disclosed in Japanese Patent Laid-Open Publication No. 57-205708 (hereinafter referred to as first prior art), Japanese Patent Laid-Open Publication No. 59-143119 (hereinafter referred to as second prior art), and Japanese Patent Laid-Open Publication No. 61-208010 (hereinafter referred to as third prior art).

According to the first prior art, each of free ends of the branch fibers is removed by shearing, cutting or grinding to define an undercut face adjacent the end face thereof. The undercut face is inclined at a predetermined angle to the axis of the fiber. Needless to say, the core of the fiber is exposed at both the undercut face and end face. Then, the undercut faces are brought in contact with each other to form the joined section of the branch fibers. Thereafter, the end face of the joined section and that of the trunk fiber are connected with each other. Therefore, unless a reflection layer consisting of a material such as aluminum, gold or silver is formed between the undercut faces confronting each other, light which is inputted to one of the branch fibers from the trunk fiber would leak into the other branch fiber through the undercut faces. Each of the branch fibers is required to be cut with high accuracy so that the undercut face is inclined precisely at a predetermined angle to the axis thereof. In addition, such highly accurate work must be carried out at a factory having special equipment to do so. For example, it is difficult to cut optical fibers with such high accuracy at a job site where they are to be installed. A high reproducibility of the optical coupler having a constant signal branching ratio cannot be accomplished due to the above-described situation.

According to the optical coupler of the second prior art, both ends of two branch fibers are inserted into a pair of fixtures serving as a die for deforming optical fibers and holding them. The two branch fibers are softened by heating them; then, the branch fibers are clamped by the fixtures. Consequently, the branch fibers are integrated with each other. The end face of the integrated section of the two branch fibers becomes approximately elliptical. Then, a trunk fiber is connected with the integrated section of the branch fibers thus formed by bringing the circular end face of the former into contact with the elliptical end face of the latter so as to form the optical coupler. The diameter of the circular end face of the trunk fiber is approximately equal to the minimum diameter of the elliptical end face of the joined section of the two branch fibers. That is, the sectional area of the trunk fiber is smaller than that of the joined section of branch fibers. According to this prior art, the trunk fiber is moved along the major axis of the elliptical end face of the joined section of the two branch fibers so that the trunk fiber can be connected with the two branch fibers at a position based on a desired signal branching. Further, the optical coupler can be fabricated with comparative ease. As is apparent from the above description, the signal branching ratio of the optical coupler is determined according to a position at which the trunk fiber is connected with the two branch fibers. Consequently, the optical coupler in accordance with the second prior art has necessarily the following disadvantage. A signal loss is not so large in the transmission of a signal from the trunk fiber to the branch fibers, but a signal loss is 50% or more in the transmission of a signal from the branch fibers to the trunk fiber. Thus, the optical coupler cannot be used to carry out a bidirectional transmission of a signal.

According to the optical coupler of the third prior art, similarly to the first prior art, each of free ends of the branch fibers is removed by shearing, cutting or grinding to define an undercut face adjacent the end face thereof. The undercut face is inclined at a predetermined angle to the axis of the fiber. Needless to say, the core of the fiber is exposed at both the undercut face and end face. Then, the undercut faces are brought in contact with each other to form the joined section of the branch fibers. Thereafter, the end face of the joined section and that of the trunk fiber are connected with each other. Therefore, unless a reflection layer consisting of a material such as aluminum, gold or silver is formed between the undercut faces confronting each other, light which is inputted to one of the branch fibers from the trunk fiber would leak into the other branch fiber through the undercut faces. Each of the branch fibers is required to be cut with high accuracy so that the undercut face is inclined precisely at a predetermined angle to the axis thereof. In addition, such highly accurate work must be carried out at a factory having special equipment to do so. For example, it is difficult to cut optical fibers with such high accuracy at a job site where they are to be installed. A high reproducibility of the optical coupler having a constant signal branching ratio cannot be accomplished due to the above-described situation. In the first prior art, the plurality of branch fibers are brought into contact with each other with a reflection layer interposed between the respective undercut faces thereof. According to the third prior art, cores of respective branch fibers and cladding thereof are joined to each other by means of fusing without interposing reflection layers between the respective undercut faces. Although this construction causes little signal loss to be produced when transmitting a signal, it is difficult to obtain a desired signal branching ratio because light permeates between branch fibers through the welded undercut faces.

SUMMARY OF THE INVENTION

Accordingly, the present invention has been made to overcome the above-described disadvantages and has as its essential object to provide a method and an apparatus for forming the joined section of optical branch fibers, which provides an accurate signal branching ratio with ease and high reproducibility so as to enable the realization of an optical coupler which has a desired signal branching ratio and which can be utilized to facilitate bidirectional communication.

In accomplishing this and other objects, a method for forming a joined section of a plurality of optical fibers, namely, the joined section of a plurality of optical branch fibers which will be connected with a single optical trunk fiber at the end faces thereof, comprises the steps of:

heating a draw die having a through-hole, for shaping the branch fibers, the sectional configuration and area of which are equal to those of the end face of the trunk fiber as taken perpendicular to the axis thereof;

supplying the plurality of branch fibers to the heated die in a predetermined ratio corresponding to a predetermined signal branching ratio, respectively; and simultaneously drawing the plurality of the branch fibers through to the die.

The area and configuration of a through-hole formed in the shaping section of the die for forming the joined section of the branch fibers are equal to the area and configuration of the end face of the trunk fiber which extends perpendicular to the axis of the trunk fiber. Therefore, the sectional area and configuration of the end face of the joined section of the branch fibers perpendicular to the axis thereof are equal to those of the end face of the trunk fiber, so that the end faces of the trunk fiber and the joined section of the branch fibers will be connected with each other by bringing both end faces into contact with each other. Accordingly, the connected optical fibers can be utilized in transmitting an optical signal between the trunk fiber and the branch fibers, namely, in a bidirectional communication mode because the amount of light which will be lost is equally small in both directions.

The branch fibers are deformed with the cores thereof encircled with the cladding thereof because no cladding is broken when forming the joined section of the branch fibers by drawing. Therefore, in the joined section, no light permeates between the adjacent branch fibers through the boundary therebetween.

Since a plurality of the branch fibers are simultaneously drawn through the single die, the ratio between respective sectional areas of the end faces of the branch fibers corresponds to the quantitative ratio between respective branch fibers supplied to the die.

The signal branching ratio is determined by the ratio of the intensities of light outputted from the branch fibers in correspondence with light distributed from the trunk fiber to the respective branch fibers. The ratio between the intensities of light outputted from the branch fibers is approximately proportional to the ratio between the intensities of light inputted to the respective branch fibers from the trunk fiber. The ratio between the intensities of light inputted to the respective branch fibers is proportional to the ratio between the areas of the cores of the branch fibers at the end faces of the joined section of the branch fibers. Accordingly, the signal branching ratio is approximately proportional to the ratio of the areas of respective branch fibers at the end face of the joined section.

According to the method of the present invention, since the ratio between the areas of respective branch fibers at the end face of the joined section is accurately obtained, a desired signal branching ratio can be obtained with high reproducibility. The method for obtaining a desired signal branching ratio by the present invention is much easier to carry out than the method for obtaining a desired signal branching ratio by forming the joined section after shearing, cutting or grinding a plurality of optical fibers to form a joined section of branch fibers. Further, the method has higher probability in reproducing a constant signal branching ratio.

In particular, the die softens a plurality of branch fibers by heating, so that they can be deformed into the joined section with ease and high accuracy, which also contributes to the increased probability in reproducing the constant signal branching ratio.

An apparatus to be used to carry out the method, according to the present invention, for forming the joined section of optical fibers, namely, the joined section of a plurality of optical branch fibers which will be connected with a single optical trunk fiber at the end faces thereof comprises:

a die having a through-hole, for shaping the branch fibers, the sectional configuration and area of which are equal to those of the end face, of the trunk fiber as taken perpendicular to the axis thereof;

means for heating the die;

means for supplying the plurality of the branch fibers to the die in a predetermined ratio corresponding to a predetermined signal branching ratio, respectively; and driving means for simultaneously drawing the plurality of the branch fibers through the die.

A method for forming the joined section in accordance with the present invention provides an optical coupler comprising:

a single optical trunk fiber having an end face perpendicular to the axis thereof; and a plurality of optical branch fibers having a joined section formed by respective ends of the fibers joined with each other;

the joined section having an end face whose area and sectional configuration perpendicular to the axis thereof are equal to those of the end face of the trunk fiber so that the end face of the joined section can be brought in contact with the end face of the trunk fiber; and, at the joined section, each of the plurality of the branch fibers has a core and cladding and, the ratio of the areas of respective end faces of the branch fibers, perpendicular to the axes thereof, is substantially equal to a desired signal branching ratio.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
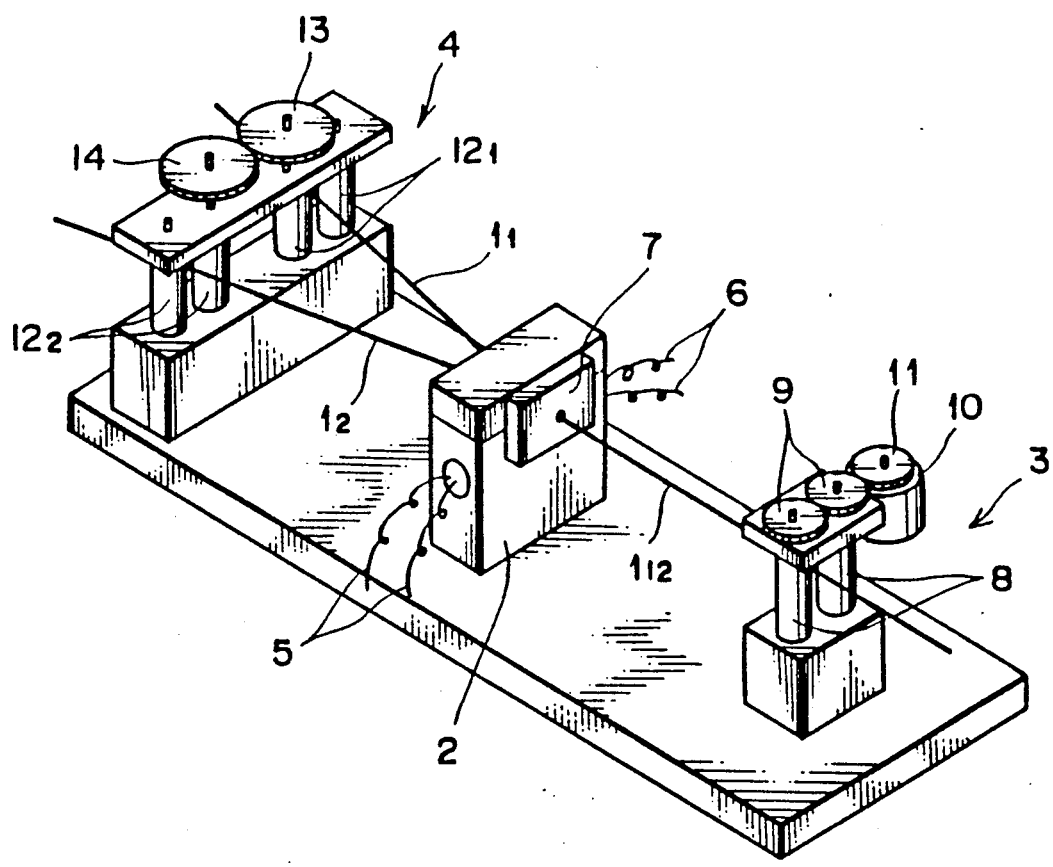
FIG. 1 is a schematic perspective view of an apparatus for forming the joined section of optical branch fibers according to an embodiment of the present invention.

Referring now to the drawings, there is shown in FIG. 1, a perspective view of an apparatus for joining a plurality of optical branch fibers according to a preferred embodiment of the present invention. The apparatus comprises a supply section 4, a draw die 2, and a driving section 3. The die 2 is disposed in approximately the center of the apparatus. The supply section 4 disposed rearward of the die 2 serves as a means for supplying optical fibers $1_1$ and $1_2$ to the die 2 at a predetermined quantitative ratio. The fibers $1_1$ and $1_2$ introduced into the die 2 are drawn simultaneously and formed into a joined fiber $1_{12}$. The driving section 3 disposed forward of the die 2 pulls the joined fiber $1_{12}$. As described in detail below, in this embodiment, the fibers $1_1$ and $1_2$ have equal diameters and move forward at an equal speed. Therefore, the fibers $1_1$ and $1_2$ are supplied to the die 2 in the same amount.

The die 2 made of brass includes an electric heater (not shown). A lead wire 5 for the electric heater and a thermocouple lead wire 6 for measuring the temperature of the die 2 are connected with the die 2. The optical fiber according to this embodiment is made of plastic and the die 2 is heated to approximately 130° C. by the heater to soften the fibers $1_1$ and $1_2$ introduced into the die 2. Therefore, when the fibers $1_1$ and $1_2$ are fed through a through-hole of the die 2, they are deformed smoothly and there is no gap left between the outer surface of the fiber $1_1$ as well as the fiber $1_2$ and the through-hole of the die 2. A brass fixture 7 mounted on the front face of the die 2 holds the joined fiber $1_{12}$ by a predetermined length. Thereafter, the joined fiber $1_{12}$ is cut along the front face of the fixture 7 at a right angle to the axis thereof so as to form an end face to be connected with a trunk fiber which is described below.

Figure 2A:
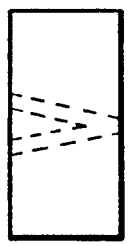
FIGS. 2A and 2B are a plan view and a side elevational view, respectively, of one embodiment of the die shown in FIG. 1.
Figure 3A:
FIGS. 3A and 3B are a plan view and a side elevational view, respectively, of another embodiment of a die according the present invention.
Figure 2B:
Figure 3B:

The die 2 has a through-hole to receive, shape and feed the fibers $1_1$ and $1_2$. The through-hole has two inlets which join one another as shown in FIGS. 2A and 2B. Preferably, the through-hole is Y-shaped or V-shaped as viewed in plan as shown in FIGS. 2A and 2B or is conic as shown in FIGS. 3A and 3B. In both configurations, the sectional configuration and the diameter of the joined optical fiber $1_{12}$ are determined by the smallest sectional area of the through-hole. That sectional configuration and area is identical to the end face of a trunk fiber, to be connected with the joined fiber $1_{12}$, extending perpendicular to the axis thereof. The die 2 comprises an upper die and a lower die separable from each other. The tapered fibers $1_1$ and $1_2$ are inserted into the through-hole of the die 2 or they are placed on a groove formed on the lower die after they are narrowed by heating, twisting, and stretching them, then the upper die having a groove on the bottom thereof is placed on the lower die. Thereafter, the fibers are fed forward through the die 2.

The driving section 3 includes two rubber rollers 8 which pull the joined fiber $1_{12}$ by rotating while sandwiching the fiber therebetween. The shafts of the rubber rollers 8 are connected with a pair of meshed gears 9 having a gear ratio of 1:1 so that the rubber rollers 8 rotate at an equal speed. The stepping motor 10 transmits force for driving the rubber rollers 8 to either of the gears 9 through a gear 11 coaxially mounted on the stepping motor 10. Thus, the rubber rollers 8 pull the joined fiber $1_{12}$ at a constant speed.

Figure 4:
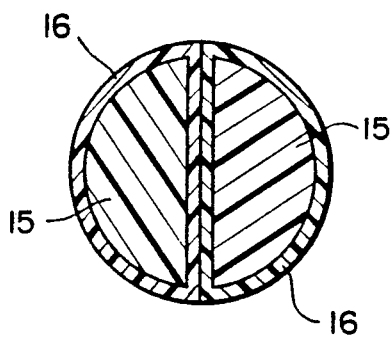
FIG. 4 is a sectional view of the joined section of branch fibers, taken perpendicular to the axis thereof according to an embodiment of the present invention.

The supply section 4 includes a plurality of pairs of rubber rollers in correspondence with the number of optical branch fibers to be joined with each other. According to this embodiment, the supply section 4 has two pairs of rubber rollers $12_1$ and $12_2$ which are interlocked with each other through gears 13 and 14 to which one of the shafts of each of the pairs of rubber rollers $12_1$ and $12_2$ are respectively connected. The gears 13 and 14 engage each other at a predetermined gear ratio so that the rubber rollers $12_1$ and $12_2$ rotate at a predetermined speed. The gear ratio between the gears 13 and 14 is determined according to a desired signal branching ratio. For example, supposing that the diameters of the optical fibers $1_1$ and $1_2$ are identical to each other and the signal branching ratio therebetween is to be set as 1:1, the gear ratio between the gears 13 and 14 is set as 1:1. That is, the rubber rollers $12_1$ and $12_2$ rotate at an equal speed, whereby the fibers $1_1$ and $1_2$ are supplied to the die 2 in the same amount. Consequently, the fibers $1_1$ and $1_2$ are joined with each other by the die 2 with the sectional area ratio therebetween being 1:1, so that the signal branching ratio therebetween is 1:1. FIG. 4 is a vertical sectional view showing the configuration of the joined optical fiber $1_{12}$ formed according to the above-described condition. The fibers $1_1$ and $1_2$ are formed into the joined fiber $1_{12}$ with the configurations thereof deformed as shown. However, the structure, in which cores 15 are encircled with layers of cladding 16, is maintained and as such, no light permeates between the cores 15,15 of the fibers $1_1$ and $1_2$.

Figure 5A:
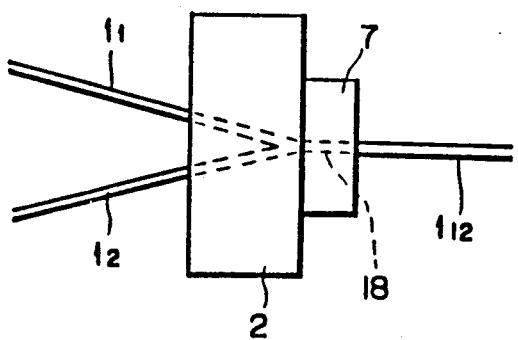
FIGS. 5A and 5B are explanatory views illustrating the manner in which branch fibers and a trunk fiber are connected with each other according to an embodiment of the present invention.
Figure 5B:
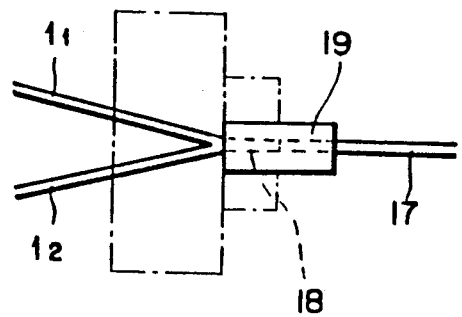

Referring to FIGS. 5A and 5B, the process of connecting the joined fiber $1_{12}$ with a trunk fiber 17 is described below. First, the joined fiber $1_{12}$ extending from the front face of the die 2 to the driving section 3 is cut along the front face of the fixture 7 so that the joined section 18 disposed inside the fixture 7 can be connected to the trunk fiber 17. Thereafter, the fixture 7 is removed from the die 2 and separated from the optical fiber $1_{12}$ so that the end faces of the trunk fiber 17 and the joined section 18 can be brought into contact and connected with each other by a known connector 19 before the die 2 is separated from the joined fiber $1_{12}$. Thus an optical coupler according to the invention is obtained.

The experimental results of the properties exhibited by optical couplers formed according to the embodiment are shown in Table 1 below.

TABLE 1

| No. | gear ratio | signal branching ratio | loss (db) |
| --- | --- | --- | --- |
| 1 | 40:40 | 1.12:1.00 | 1.6 |
| 2 | 40:40 | 1.00:1.00 | 1.3 |
| 3 | 50:28 | 1.00:1.68 | 1.9 |
| 4 | 50:28 | 1.00:1.89 | 2.1 |

The above gear ratio is the gear ratio between the gears 13 and 14 of the supply section.

Figure 6:
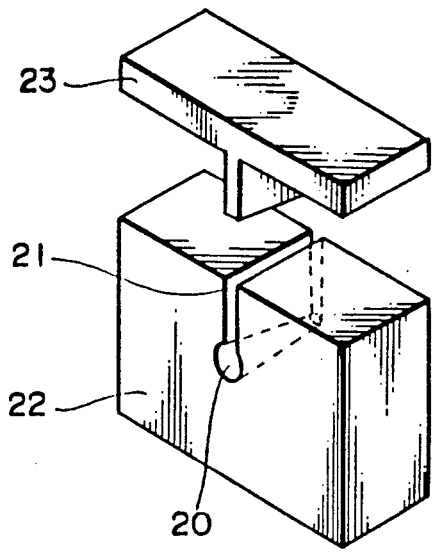
FIG. 6 is an exploded perspective view of a die according to yet another embodiment of an apparatus for forming the joined section of optical branch fibers according to the present invention.

Referring to FIG. 6, a modification of the die 2 is described below. The die comprises an upper die 23 and a lower die 22. The upper die 23 is inserted into the lower die 22 through a groove 21. The groove 21 and a conic through-hole 20 are formed in the lower die 22. The groove 21 extends upward from the top of the through-hole 20. The width of the groove 21 is equal to the diameter of the smallest sectional area of the through-hole 20. Similarly to the through-holes as shown in FIGS. 2 and 3, the diameter of the joined fiber $1_{12}$ is determined by the smallest sectional area of the through-hole 20. The fibers $1_1$ and $1_2$ are inserted into the groove 21, and are then pressed against that portion of the die 22 defining the bottom of the through-hole 20 by the upper die 23.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise depart therefrom.

What is claimed is:

1. A method of forming an optical coupler in which a plurality of optical fibers are coupled with a single optical trunk fiber, said method comprising the steps of:

providing an optical trunk fiber having an end face extending perpendicular to the axis thereof;

providing a die having a through-hole having a cross-sectional portion of the same area and configuration as those of the end face of the optical trunk fiber;

supplying a plurality of optical fibers to the die in amounts of a predetermined ratio corresponding to a predetermined signal branching ratio of the intensities of light which will be transmitted by the fibers based on a distribution to the fibers of a given amount of light transmitted to the fibers, collectively;

heating the die; and simultaneously drawing the plurality of fibers through the through-hole of the heated die in a manner in which the fibers are deformed into a joined section in which the fibers are joined together and the ratio of the areas of the fibers in a cross section of said joined section correspond to said predetermined signal branching ratio; and placing the end face of the optical trunk fiber in contact with an end face of the joined section extending perpendicular to the axis of the joined section, and coupling the optical trunk fiber and the joined section so in place.

2. An apparatus for forming the joined section of a plurality of optical branch fibers, said apparatus comprising:

a die having a through-hole extending therethrough for shaping optical fibers drawn therethrough;

heating means operatively associated with said die for heating said die;

means for supplying a plurality of optical fibers to said die in amounts of a predetermined ratio corresponding to a predetermined signal branching ratio of the intensities of light which will be transmitted by the fibers based on a distribution to the fibers of a given amount of light transmitted to the fibers, collectively; and driving means for simultaneously drawing the plurality of fibers through the through-hole of said die.

3. An optical coupler comprising:

a single optical trunk fiber having an end face extending perpendicular to the axis thereof; and a plurality of optical branch fibers having a joined section in which respective ends of said branch fibers are joined to each other;

said joined section having an end face extending perpendicular to the axis thereof and whose area and sectional configuration are equal to those of the end face of said trunk fiber, said joined section being coupled to said optical trunk fiber with the end face of said joined section being in contact with the end face of said trunk fiber over the entirety thereof; and at said joined section, each of the plurality of said branch fibers having a core and cladding extending around the core and, the ratio between the areas of respective end faces of said branch fibers, at the end face of the joined section and extending perpendicular to the axes of the branch fibers, being substantially equal to a desired signal branching ratio of the intensities of light which will be transmitted by the branch fibers based on a distribution to the branch fibers of a given amount of light transmitted to the fibers, collectively, by said optical trunk fiber.

4. A method of forming a joined section of a plurality of optical fibers, said method comprising the steps of:

providing a die having a through-hole extending therethrough;

supplying a plurality of optical fibers to the die in amounts of a predetermined ratio corresponding to a predetermined signal branching ratio of the intensities of light which will be transmitted by the fibers based on a distribution to the fibers of a given amount of light transmitted to the fibers, collectively;

heating the die; and simultaneously drawing the plurality of fibers through the through-hole of the heated die in a manner in which the fibers are deformed into a joined section in which the fibers are joined together and the ratio of the areas of the fibers in a cross section of said joined section correspond to said predetermined signal branching ratio.

* * * * *